United States Patent
Benzler et al.

(10) Patent No.: US 7,224,733 B1
(45) Date of Patent: May 29, 2007

(54) INTERPOLATION FILTERING METHOD FOR ACCURATE SUB-PIXEL MOTION ASSESSMENT

(75) Inventors: Ulrich Benzler, Langenhagen (DE); Oliver Werner, Luadzen (DE)

(73) Assignee: Robert Bosch GmbH, Stuttgart (DE)

( * ) Notice: Subject to any disclaimer, the term of this patent is extended or adjusted under 35 U.S.C. 154(b) by 443 days.

(21) Appl. No.: 09/462,863

(22) PCT Filed: Jul. 11, 1998

(86) PCT No.: PCT/DE98/01938

§ 371 (c)(1),
(2), (4) Date: May 8, 2000

(87) PCT Pub. No.: WO99/04574

PCT Pub. Date: Jan. 28, 1999

(30) Foreign Application Priority Data

Jul. 15, 1997 (DE) ................ 197 30 305

(51) Int. Cl.
 *H04B 1/66* (2006.01)
(52) U.S. Cl. .............. 375/240.17; 375/240.16; 375/240.02; 375/240.12; 375/240.29; 375/240.26; 382/238; 382/236; 382/239; 348/699
(58) Field of Classification Search .......... 375/240.17, 375/240.11, 240.16, 240.02, 240.12, 240.29, 375/240.26; 382/236, 238, 243, 261, 107, 382/239; 348/402, 403, 416, 407–409, 429.1, 348/624, 607, 606, 618–619, 601, 620–621, 348/397–398, 699
See application file for complete search history.

(56) References Cited

U.S. PATENT DOCUMENTS

| | | | | |
|---|---|---|---|---|
| 4,890,160 A | * | 12/1989 | Thomas | 348/429.1 |
| 5,043,808 A | * | 8/1991 | Knauer et al. | 375/240.11 |
| 5,347,599 A | * | 9/1994 | Yamashita et al. | 382/278 |
| 5,502,489 A | * | 3/1996 | Kim et al. | 348/607 |
| 5,541,660 A | * | 7/1996 | Kim et al. | 375/240.16 |
| 5,600,731 A | * | 2/1997 | Sezan et al. | 382/107 |
| 5,684,538 A | * | 11/1997 | Nakaya et al. | 375/240.17 |
| 5,991,447 A | * | 11/1999 | Eifrig et al. | 382/236 |
| 6,057,884 A | * | 5/2000 | Chen et al. | 348/416 |

(Continued)

FOREIGN PATENT DOCUMENTS

EP 0 348 207 12/1989

(Continued)

OTHER PUBLICATIONS

Zeigler M; Hierarchical Motion Estimation Using The Phase Correlation Method in 140 MBIT/S HDTV-CODING; Sep. 1989; Signal Processing of HDTV; pp. 131-137.*

(Continued)

*Primary Examiner*—Shawn S. An
(74) *Attorney, Agent, or Firm*—Kenyon & Kenyon LLP

(57) ABSTRACT

To generate an improved image signal when estimating motion, a motion vector is first determined with pel accuracy, and a two-step interpolation filtering is subsequently carried out with sub-pel accuracy. The interpolation coefficients are selected with a view to reducing aliasing. More neighboring pixels are used for the interpolation than in usual interpolation methods. One is able to improve the quality of the prediction signal for video images and, consequently, enhance coding efficiency.

7 Claims, 2 Drawing Sheets

U.S. PATENT DOCUMENTS 6,069,670 A * 5/2000 Borer ..................... 348/620
6,122,017 A * 9/2000 Taubman ................ 348/620
6,714,593 B1 * 3/2004 Benzler et al. ........ 375/240.16

FOREIGN PATENT DOCUMENTS

EP 0 558 922 9/1993

OTHER PUBLICATIONS

Ziegler, Hierarchical motion estimation . . . HDTV-coding, 1990, SIEMENS AG, signal processing of HDTV, 131-136.*
Ziegler, Hierarchical motion estimation . . . HDTV coding, 1990 SIEMENS AG, signal processing of HDTV, 131-136.*
Zeigler M; Heirarchical Motion Estimation Using the Phase Correlation Method in 140 MBIT/S HDTV-Coding; Sep. 1, 1989; pp. 131-137.
Werner O; Drift Analysis and Drift Reduction for Multiresolution Hybrid Video Coding; Jul. 1, 1996; pp. 387-409.
Siu-Leong Iu; Comparison of Motion Compensation Using Different Degrees of Sub-Pixel Accuracy for Interfield/Interframe Hybrid Coding of HDTV Image Sequences; Mar. 23, 1996; pp. 465-468.
International Organization for Standardization; Munich Meeting of MPEG-4 Working Group; Jan. 1996; pp. 3-49.

* cited by examiner

INTERPOLATION FILTERING METHOD FOR ACCURATE SUB-PIXEL MOTION ASSESSMENT

FIELD OF THE INVENTION

The present invention relates to a method for generating an improved image signal when estimating the motion of image sequences, in particular a prediction signal for video images using motion-compensating prediction, with motion vectors, which, for each picture block of a current image, indicate the position of the picture block used for the prediction with respect to a chronologically preceding reference image, being formed for picture blocks.

BACKGROUND INFORMATION

European Patent No. 0 558 922 describes a method for improving motion estimation in image sequences, in half-pel accuracy, according to the full-search method. There, in a first process step, the search area, and in a second process step, the match block are filtered with the aid of an additional digital filter which enables a raster shift of the pixel raster by ¼ pel. Using this measure, a distortion of the motion vector field can be ruled out.

In "MPEG-4 Video Verification Model Version 7.0", Bristol, April 1997, MPEG 97/N1642 in ISO/IEC JTC1/SC 29/WG11, an encoder and decoder for object-based coding of video image sequences are specified. In this context, one no longer encodes and transmits rectangular pictures of a fixed size to the receiver, but instead, so-called "VIDEO OBJECTS" (VO) of any shape and size. The image formation of such a VO in the camera image plane at a specific instant is referred to as a VIDEO OBJECTS PLANE (VOP). Consequently, the relation between VO and VOP is equivalent to the relation between image sequence and image in the case of the transmission of rectangular pictures of fixed size.

The motion-compensating prediction in the verification model is carried out with the assistance of so-called "block-wise motion vectors" which, for each block of the size 8×8 or 16×16 pixels of the current image, specifies the position of the block used for the prediction in an already transmitted reference image. In this context, the resolution of the motion vectors is limited to half of a pixel, pixels between the scanning raster (half-pixel position) being generated by a bilinear interpolation filtering from the pixels on the scanning raster (integer pixel position) (FIG. 1). In this case, + indicates the integer-pixel position, and O the half-pixel position. Interpolated values a, b, c, and d in half-pixel position are derived from the following relations:

$a=A$, $b=(A+B)//2$, $c=(A+C)//2$, $d=(A+B+C+D)//4$, // indicating a rounded integer division.

SUMMARY OF THE INVENTION

By applying the principles of the present invention, one can improve the quality of the prediction signal and, thus, the coding efficiency. In so doing, a greater local neighborhood is considered than in the case of bilinear interpolation, to generate pixels between the pixel scanning raster. The aliasing-reducing interpolation filtering according to the present invention leads to an increased resolution of the motion vector and, consequently, to a prediction gain and an increased coding efficiency. In the present invention, the FIR filter coefficients can be adapted to the signals to be coded, and be transmitted separately for each video object, thereby further increasing coding efficiency and enhancing the flexibility of the method.

In contrast to the design approach according to European Patent No. 0 558 922, there is no need to design any additional polyphase filter structures for intermediate positions having ¼ pel pixel resolution in the horizontal and vertical directions.

By applying the principles of the present invention, the image sequence frequency of an MPEG-1 coder can be doubled from 25 Hz to 50 Hz, with the data rate remaining constant. In the case of an MPEG-2 coder, the data rate can be reduced by up to 30%, with the image quality remaining constant.

DETAILED DESCRIPTION

In the case of the method according to the present invention, motion vectors are formed for picture blocks, the motion vectors, for each picture block of a current image, indicating the position of the picture block used for the prediction with respect to a chronologically preceding reference image.

The motion vectors for the prediction are determined in three successive steps:

In a first search step, a motion vector is determined for each picture block with pel accuracy in accordance with a conventional method, for example, in accordance with the full-search block matching method. In this context, the minimum error criterion is determined for possible motion positions, and the vector which best describes the motion of the picture block is selected (European Patent No. 0 368 151).

Figures 1, 2:
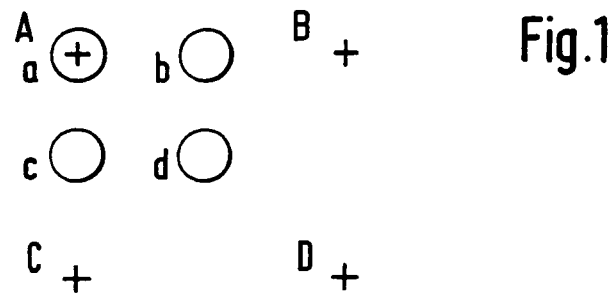
FIG. 1 shows a positional diagram.
FIG. 2 shows an interpolation diagram for pixels between the pixel scanning raster.

In a second search step, which, again, is based on such a search for the minimum error criterion, an improved motion vector is ascertained with sub-pel accuracy, starting out from the motion vector ascertained in the first step, using an aliasing-reducing interpolation filtering, with the aid of a digital, symmetric FIR (finite impulse response) filter. In the process, a higher resolution is selected than in the first search step. Preferably, one selects a resolution of a half pixel relative to the pixel raster. FIG. 2 illustrates the interpolation pattern for pixels b, c, and d between the pixel raster, as derived from the neighboring pixels A, B, C, D, E, F, G, H on the pixel raster. + indicates the integer-pixel position, O the half-pixel position, so that:

$b=(CO1x(A_{-1}+A_{+1})+CO2x(A_{-2}+A_{+2})+CO3x(A_{-3}+A_{+3})+CO4x(A_{-4}+A_{+4}))/256$ $c_i=(CO1x(A_i+E_i)+CO2x(B_i+F_i)+CO3x(C_i+G_i)+GO4x(D_i+H_i))/256$ $d=(CO1x(c_{-1}+c_{+1})+CO2x(c_{-2}+c_{+2})+CO3x(c_{-3}+c_{+3})+CO4x(c_{-4}+c_{+4}))/256$

Figure 3:
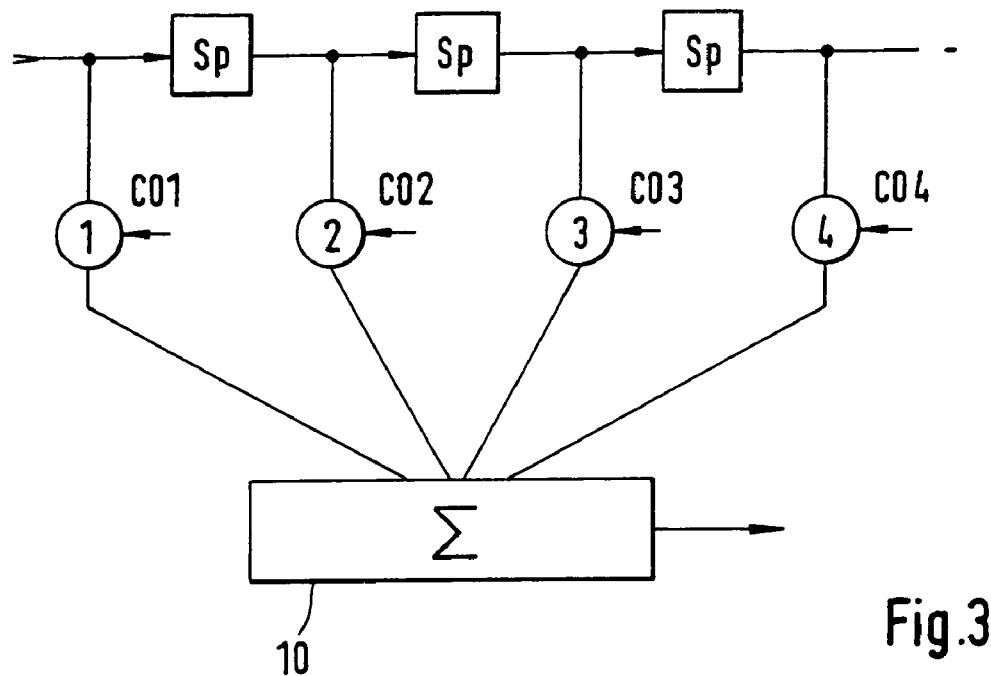
FIG. 3 shows the structure of an FIR filter for interpolation.

The structure of the FIR interpolation filter used is apparent in FIG. 3. Following each pixel position δp, it branches to a coefficient evaluator 1, 2, 3, etc., and has a summing device 10 at the output. As is apparent from the above relationships, a greater local neighborhood is considered when generating pixels between the scanning raster, than in the case of the bilinear interpolation according to the related art. In this context, the interpolation filter coefficients CO2, CO3, CO4 are determined in a way that minimizes the interpolation error performance. The coefficients can be determined directly using the known estimation method of the least root-mean-square error. From the minimization of the interpolation error performance, one obtains a linear system of equations, whose coefficients can be derived from the principle of orthogonality. A set of FIR filter coefficients optimized in this manner is given by the coefficients $CO1=161/256$, $CO2=43/256$, $CO3=23/256$, $CO4=-8/256$.

In the third search step, starting from the motion vector determined with an accuracy of ½ pel, a local search is performed using a further interpolation filtering, taking the eight neighboring pixels as a basis, with resolution that is increased still further, preferably to ¼ pixel. As before, one selects the motion vector having the lowest prediction error performance.

Figure 4:
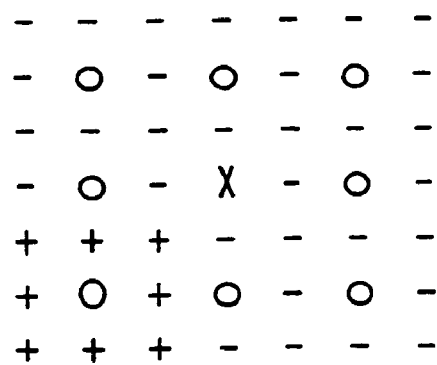
FIG. 4 shows a further interpolation having an even higher resolution.

FIG. 4 shows the interpolation pattern for this. The integer pixel positions are marked by X, the half-pixel positions by O, and the quarter-pixel positions by –. O indicates the best compensation with ½ pixel, and + the quarter-pixel search position.

The interpolation is carried out relative to the pixel raster, with a half-pixel resolution from the second search step, using filter coefficients $CO1'=½$, $CO2'=O$, $CO3'=O$, $CO4'=O$.

The same previously introduced interpolation technique is used for the motion-compensating prediction.

If the processing is carried out within a coder having a reduced image format (SIF format within an MPEG1 coder or Q-CIF in an H.263 coder), but the original input format is used for the display, for example, CCIR 601[1] in the case of MPEG-1 or CIF in the case of H.263, a local interpolation filtering must be carried out as a post-processing. The described aliasing-compensating interpolation filtering can be used for this purpose as well.

To activate the aliasing-compensating interpolation using ¼ resolution, activation bits can be inserted into an image-transmission bit stream.

To predict video objects, filter coefficients CO1 through CO4, and CO1' through CO4' can be separately conditioned for each of the video objects VO, and inserted into the image-transmission bit stream at the beginning of transmission of the video object in question.

For the encoding of a motion vector, the range of values of the motion vector differences to be coded can be adapted to the increased resolution.

What is claimed is:

1. A method for generating an image signal when estimating a motion of image sequences, motion vectors indicating, for each picture block of a current image, a position of the picture block used for a prediction with respect to a chronologically preceding reference image, the motion vectors being formed for each picture block, the method comprising the steps of:

in a first search step, determining a first motion vector with a pel accuracy;

starting out from the first motion vector, in a second search step, determining a second motion vector with a sub-pel accuracy by an aliasing-reducing interpolation filtering, using a digital filter, a resolution being selected to be higher than that corresponding to a resolution of a pixel raster in the first search step, more than four neighboring pixels being utilized for an interpolation of each pixel, to interpolate pixels between a scanning raster for the first search step; and in a third search step, starting from the second motion vector, determining a third motion vector by a further interpolation filtering using the digital filter, a resolution being increased once more in comparison with the second search step, an interpolation being carried out on the basis of a pixel raster, with a resolution in the second search step;

wherein coefficients for at least one of the interpolation filtering in the second search step and the further interpolation filtering in the third search step are determined from a minimization of the interpolation error performance, on the basis of a linear system of equations whose coefficients are derived from the principle of orthogonality, whereby said coefficients for at least one of the interpolation filtering in the second search step and the further interpolation filtering in the third search step are adapted to signals to be coded to achieve aliasing-reducing interpolation filtering with increased resolution of the motion vectors leading to a prediction gain and an increased coding efficiency.

2. The method according to claim 1, wherein the image signal is a prediction signal for video images generated using a motion-compensating prediction.

3. The method according to claim 1, wherein the more than four neighboring pixels are more neighboring pixels than are utilized for a bilinear interpolation.

4. The method according to claim 1, wherein, for the interpolation filtering in the second search step, an FIR filter is used having filter coefficients $CO1=161/256$, $CO2=-43/256$, $CO3=23/256$, $CO4=-8/256$.

5. The method according to claim 1, wherein for the further interpolation filtering in the third search step, an FIR filter is used having FIR filter coefficients $CO1'=½$, $CO2'=O$, $CO3'=O$, $CO4'=O$.

6. The method according to claim 1, further comprising the steps of:

in order to predict video objects, separately conditioning, for each video object, filter coefficients of the digital filter; and inserting the filter coefficients into a transmission bit stream at a beginning of transmission of an object in question.

7. The method according to claim 1, further comprising the step of:

adapting, for an encoding of a motion vector for a transmission, a range of values of motion vector differences to be coded to an increased resolution.

* * * * *